United States Patent
Tsai et al.

(10) Patent No.: US 7,187,638 B2
(45) Date of Patent: Mar. 6, 2007

(54) APPARATUS AND METHOD FOR DETECTING DEFECTS OF A RECORDING AND REPRODUCING SYSTEM

(75) Inventors: Chin-Yin Tsai, Taipei (TW); Shih-Fang Chen, Taipei (TW)

(73) Assignee: VIA Technologies, Inc., Taipei (TW)

( * ) Notice: Subject to any disclaimer, the term of this patent is extended or adjusted under 35 U.S.C. 154(b) by 553 days.

(21) Appl. No.: 10/782,352

(22) Filed: Feb. 19, 2004

(65) Prior Publication Data

US 2005/0185540 A1 Aug. 25, 2005

(51) Int. Cl.
*G11B 7/00* (2006.01)

(52) U.S. Cl. .................. 369/53.32; 369/53.15

(58) Field of Classification Search ............. 369/44.41, 369/44.32, 53.15, 53.17, 53.32, 53.35
See application file for complete search history.

(56) References Cited

FOREIGN PATENT DOCUMENTS

JP         7-320402    * 12/1995    ............... 369/44.41

* cited by examiner

*Primary Examiner*—Nabil Hindi
(74) *Attorney, Agent, or Firm*—Squire, Sanders & Dempsey

(57) ABSTRACT

The apparatus of detecting defects of the present invention includes: a photodetector, detecting a intensity of reflective laser beam and generating a reflective signal; a sample/hold circuit, coupling to the photodetector circuit, sampling and holding the reflective signal; a comparator, coupling to the sample/hold circuit, comparing the sampling and holding result with a default range; and a defect flag generating circuit, coupling to the comparator, generating a defect flag signal. The method of detecting defects of the present invention includes: monitoring a reflective signal (WRF signal) when recording an optical disk; determining if the static region of WRF signal is within a predetermined range; if no, the region is regarded as a defect region, and a defect flag is set.

15 Claims, 4 Drawing Sheets

APPARATUS AND METHOD FOR DETECTING DEFECTS OF A RECORDING AND REPRODUCING SYSTEM

BACKGROUND OF THE INVENTION

1. Field of the Invention

The invention relates to recording and reproducing system, more particularly refers to an apparatus and a method for detecting defects of the recording and reproducing system.

2. Description of the Related Art

In recent years, disk-shaped recording media such as CD-R, CD-RW, DVD-RAM, DVD-RW are widely used due to its high capacity storage and more and more low price; as a result, recording and reproducing system are public to help user writing data into a disk-shaped recording media.

A writable or rewriteable optical disk could have some defects on its surface due to scratch, fingerprint or dusty, and if data is written into such defect areas it might cause some problems afterward.

In order to avoid writing data into defect areas and to have high recording reliability, some mechanism should be implemented. That is: scanning recording tracks before recording an optical disk to make sure where are defect areas, and after scanning recording tracks, the disk defect areas would be labeled and some protection mechanism, such as Running OPC (Optimum Power Calibration), helps to dynamic modulate recording power when tracking through those defect areas, or defect management, supported by Mountain Rainier and helps to setup a defect table and directs data on those defect areas toward to the correct position, of a recording and reproducing system would be implemented to avoid recording error and accompanying with reading failure, and furthermore to increase recording reliability.

SUMMARY OF THE INVENTION

The present invention provides an apparatus and a method for detecting defects of recording and reproducing system before recording an optical disk, thus some protection mechanism could be implemented.

The apparatus of detecting defects of the present invention includes: a photodetector, detecting a intensity of reflective laser beam and generating a reflective signal; a sample/hold circuit, coupling to the photodetector circuit, sampling and holding the reflective signal; a comparator, coupling to the sample/hold circuit, comparing the sampling and holding result with a default range; and a defect flag generating circuit, coupling to the comparator, generating a defect flag signal.

The method of detecting defects of the present invention includes: monitoring a reflective signal (WRF signal) when recording an optical disk; determining if the static region of WRF signal is within a predetermined range; if no, the region is regarded as a defect region, and a defect flag is set.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENT

The present invention provides an apparatus and a method of detecting defect of a recording and reproducing system. With this invention, defects on the surface of writable or rewritable optical disks could be found and as a result some protection mechanism such as Running OPC or defect management could be implemented to avoid data recorded error.

A preferred embodiment is given as following to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore the present invention is not intended to be limited to the particular embodiments shown and described herein, but is to be accorded the widest herein disclosed.

Figure 1A:
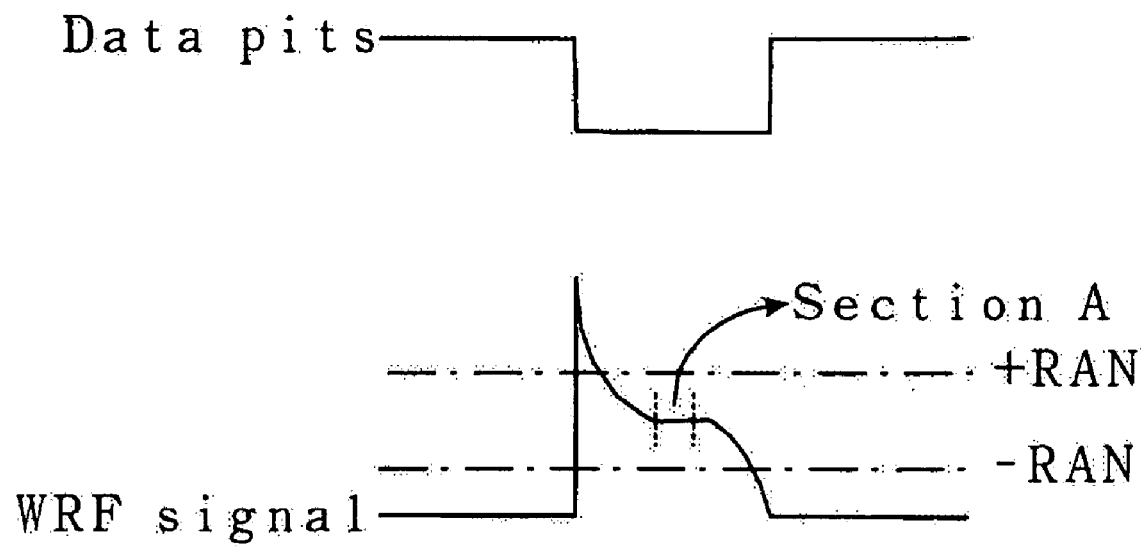
FIG. 1: A diagram of reflective laser beam waveform.
Figure 1B:
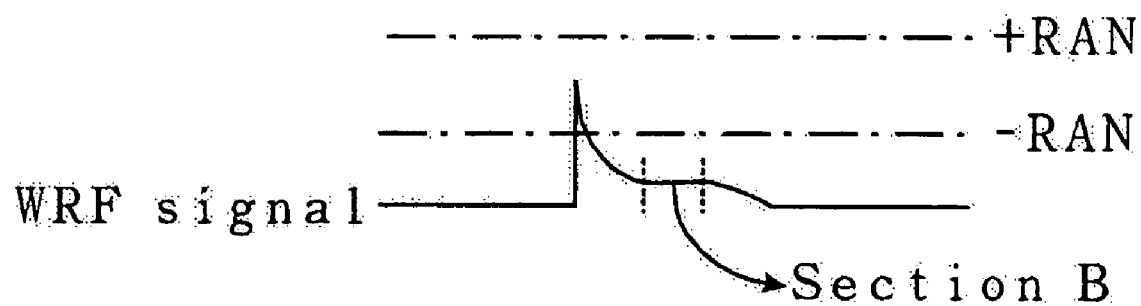
Figure 1C:
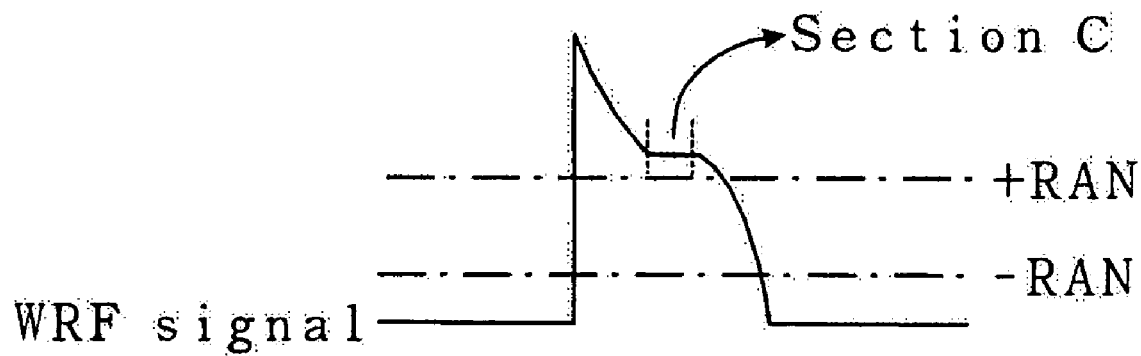

In this present invention, a reflective writing signal, WRF signak, is taken as a judgment. As refer to FIG. 1A, FIG. 1B and FIG. 1C, it is well known that, at the beginning of forming a data pit, the intensity of WRF signal is largest and has a peak, and then WRF signal becomes weaker and weaker due to interference and/or diffraction of incident and/or reflective laser beam. During the weakening, the WRF signal would keep within a fixed range for a while, and the fixed range region of the WRF signal is regarded as a static region (as shown in section A in FIG. 1A). If a defect exists, the intensity of WRF signal would become abnormal higher or lower (as shown in FIG. 1B and FIG. 1C), as a results the static region would become abnormal higher or lower (as shown in section B and section C in FIG. 1B and FIG. 1C). That is to say, a WRF signal, which static region outers a predetermined range, would be regarded as a defect area.

The apparatus for detecting defects of a recording and reproducing system 100 is shown in FIG. 1, including: a photodetector 110, detecting an intensity of reflective laser beam, and generating a reflective signal WRF signal; a sampling/hold circuit 120, coupled to the photodetector 110, sampling WRF signal and holding a fixed DC value of WRF signal with respect to the sampling point; a comparator 130, coupled to the sampling/hold circuit 120, comparing the fixed value $V_{CD}$ with a predetermined default range +/−RAN; and a defect flag generating circuit 140, coupled to the comparator 130, generating a defect flag signal DEF_FLAG, which default logic state is at a first logic state, and changing the logic state of DEF_FLAG according to the comparing results to labeled where are defect areas.

The method for detecting defects of a recording and reproducing system includes: predetermining a default range, +/−RAN; monitoring a WRF signal, from detecting the intensity of reflective laser beam when writing data, by the photodetector 110; then, sampling a static region of WRF signal and holding a fixed DC value with respect to the sampling point by the sampling/hold circuit 120; then comparing the fixed DC value with the default range +/−RAN by the comparator 130; and according to the comparing results, changing logic state of a generated defect flag signal DEF_FLAG, which default logic state is at a first logic state, according to the comparing results. That is, when DEF_FLAG is at the first logic state and if the fixed DC value is outer the default range +/−RAN, DEF_FLAG changes from the first logic state to the second logic state, otherwise, DEF_FLAG keeps in the first logic state; when DEF_FLAG is at the second logic state and if the fixed DC value is outer the default range +/−RAN, DEF_FLAG keeps in the second logic state, otherwise, DEF_FLAG changes from the second logic state to the first logic state.

Figure 2:
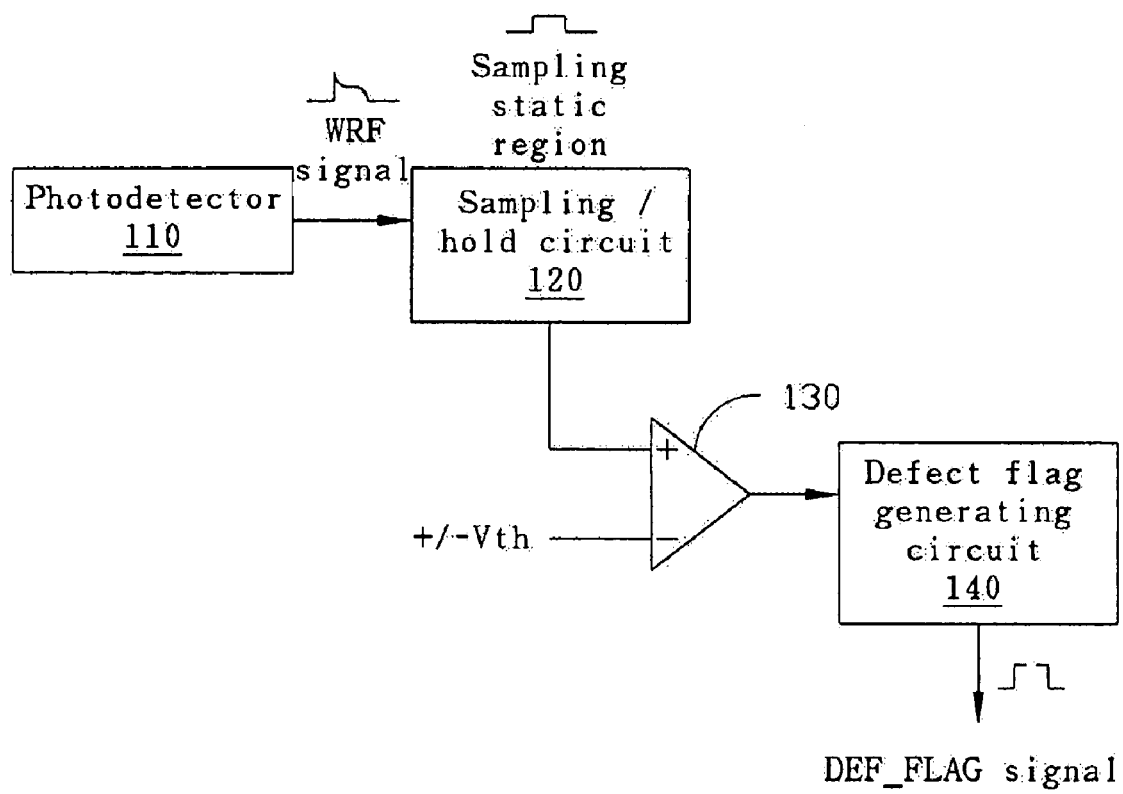
FIG. 2: An apparatus for detecting defects of the present invention.

The flowchart of the method is shown in FIG. 2:
210: setting a DEF_FLAG signal which default logic state is at the first logic state;
220: predetermining a default range +/−RAN;
230: monitoring WRF signal;
240: sampling a static region of the WRF signal and holding a fixed DC value with respect to a sampling point.
250: determining if the fixed DC value is within the default +/−RAN, if certainly, goes to step 260, otherwise goes to step 270;
260: making DEF_FLAG signal at the first logic state; and
270: making DEF_FLAG signal at the second logic state; then, goes back to step 230.

Figure 3:
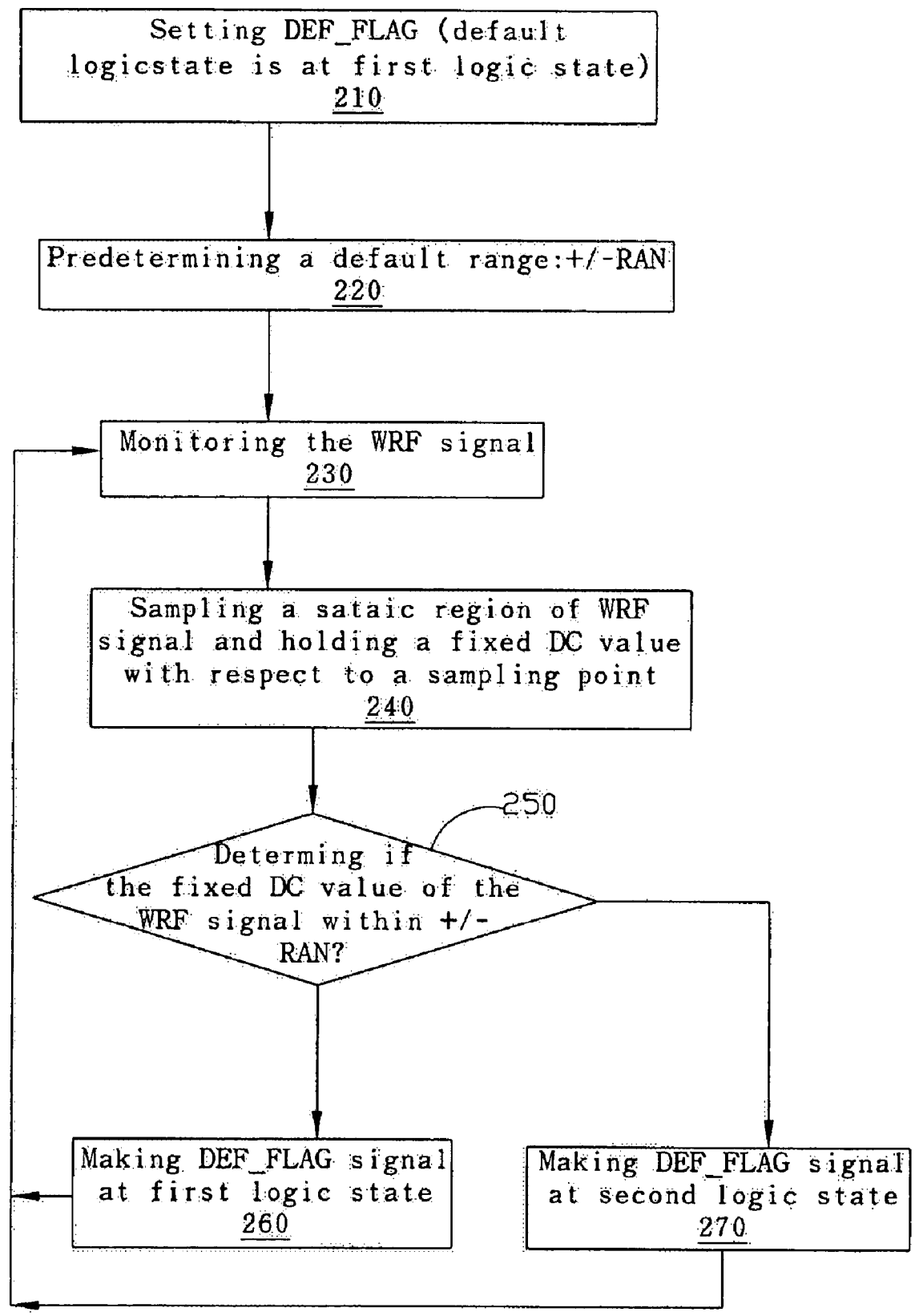
FIG. 3: A flowchart of a method for detecting defects of the present invention.
Figure 4:
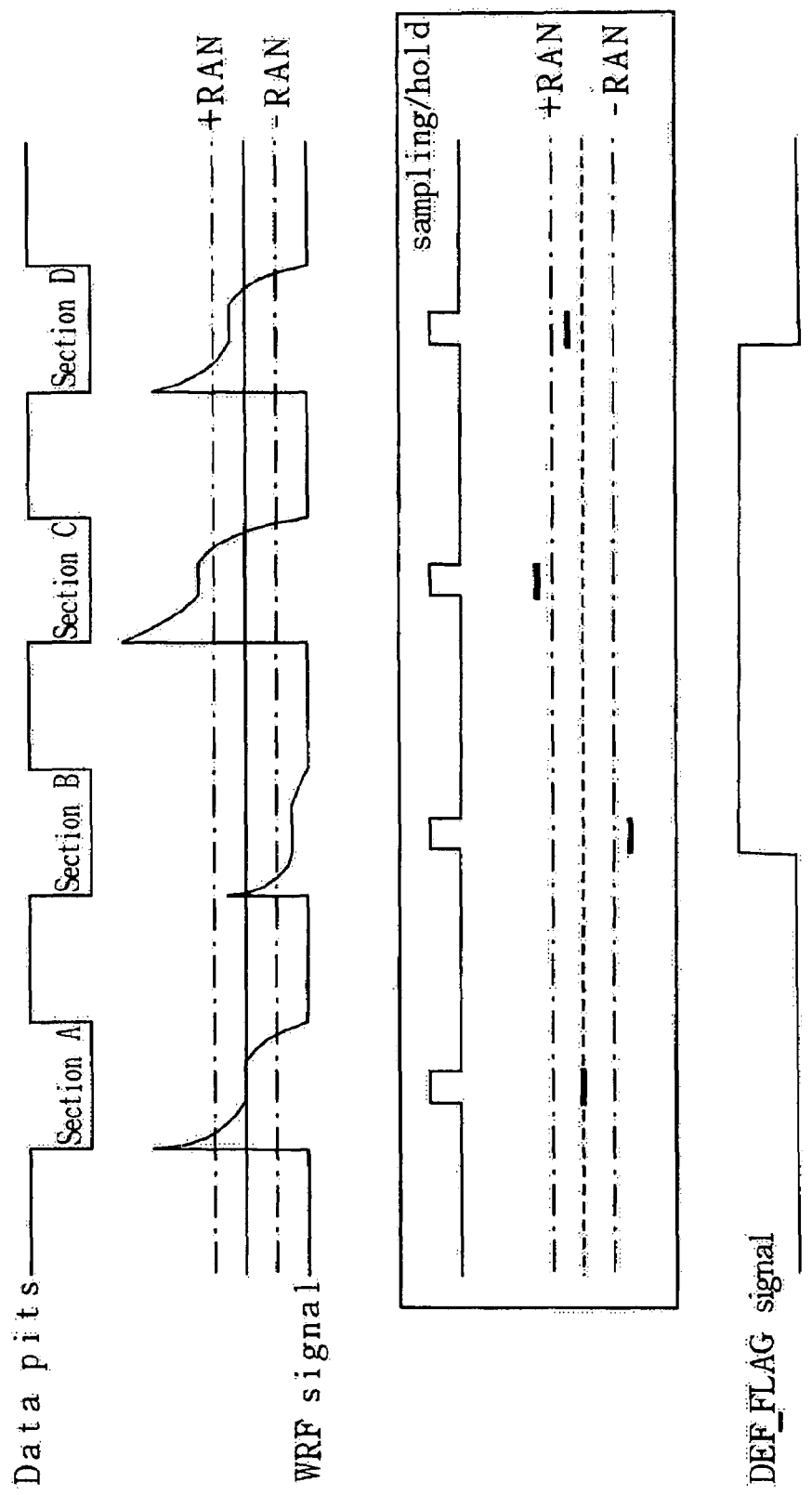
FIG. 4: A diagram of present invention waveform.

FIG. 3 is an embodiment of the present invention, assume the default logic state of DEF_FLAG is at low level logic state. It is obvious that, after sampling and holding, the section A of WRF signal which static region is within a predetermined range +/−RAN, as a result the DEF_FLAG signal keeps at low level logic state; after a while, the section B of the WRF signal which state region is outer the predetermined range +/−RAN, thus the DEF_FLAG signal changes from low level logic state to high level logic state; section C is the same with section B, which static region is outer the predetermined range +/−RAN, so the DEF_FLAG keeps in high level logic state to lable where are defect areas; and after a while, the section D of WRF signal which static region is within the predetermined range +/−RAN again, then the DEF_FLAG changes from high level logic state to low level logic state. It is to say that, the section of the WRF signal which static region is not within a predetermined default range +/−RAN (like section B and section C as shown in FIG. 4) would be regarded as a defect areas, and a DEF_FLAG signal is at high level logic state to label them and some protection mechanism of a recording and reproducing could implemented when data is recorded during those defect areas to avoid data recording error.

The present invention provides an apparatus and a method for detecting defects of a recording and a reproducing system, as a results, the recording and reproducing system could implement some protection mechanism such as Running OPC to modify the recording power when recording the defect region, or defect management supported by Mountain Rainier, to set up a defect table when recording the defect region and to direct to the correct data position when reading the defect region.

Finally, those skilled in the art should appreciate that they can readily use the disclosed conception and specific embodiment as a basis for designing or modify other structures for carrying put the same purpose of the present invention without departing from the spirit and scope of the invention as defined by the appended claims.

What is claimed is:
1. A method of detecting defect signals includes:
receiving a reference signal when recording a data pit;
sampling the reference signal and holding a DC value with respect to a sampling point of the reference signal; and
determining if said DC value is within a default range, and according to the result, setting a defect flag signal, which default logic state is at a first logic state;
wherein the sampling point is a static region of the reference signal.

2. The method of claim 1, wherein the reference signal is an intensity signal of a reflective laser beam.

3. The method of claim 1, if the defect flag signal is at the first logic state, when the DC value according to the sampling point is not within the default range, thus changing the defect flag signal at a second logic state.

4. The method of claim 1, if the defect flag signal is at the first logic state, when the DC value according to the sampling point is within the default range, thus keeping the defect flag signal at the first logic state.

5. The method of claim 1, if the defect flag signal is at a second logic state, when the DC value according to the sampling point is not within the default range, thus keeping the defect flag signal at the second logic state.

6. The method of claim 1, if the defect flag signal is at a second logic state, when the DC value according to the sampling point is within the default range, thus changing the defect flag signal at the first logic state.

7. The method of claim 1, wherein the method could be applied to a recording and reproducing system.

8. The method of claim 7, wherein the recording and reproducing system is selected from: a Cd-RW, a DVD+RW, a DVD-RW, a CD-MRW, DVD+MRW.

9. An apparatus of detecting defect signals includes:
a photodetector circuit, detecting a intensity of a reflected laser beam and generating a reflected signal when recording a data into a disk;
a sample/hold circuit, coupling to the photodetector circuit, sampling the reflected signal and holding a DC value with respect to a sampling point;
a comparator, coupling to the sample/hold circuit, comparing the DC value with a default range; and
a defect flag generating circuit, coupling to the comparator, generating a defect flag signal, which default logic state is at a first logic state, and changing its logic state according to the comparing results;
wherein the sampling point is a static region of the reflected signal.

10. The apparatus of claim 9, if the defect flag signal is at the first logic state, when the DC value according to the sampling point is not within the default range, changing the defect flag signal at a second logic state.

11. The apparatus of claim 9, if the defect flag signal is at the first logic state, when the DC value according to the sampling point is within the default range, keeping the defect flag signal at the first logic state.

12. The apparatus of claim 9, if the defect flag signal is at a second logic state, when the DC value according to the sampling point is not within the default range, keeping the defect flag signal at the second logic state.

13. The apparatus of claim 9, if the defect flag signal is at a second logic state, when the DC value according to the sampling point is within the default range, changing the defect flag signal at the first logic state.

14. The apparatus of claim 9, wherein the apparatus could be applied to a recording and reproducing system.

15. The apparatus method of claim 14, wherein the recording and reproducing system is selected from: a CD-RW, a DVD+RW, a DVD-RW, a CD-MRW, DVD+MRW.

* * * * *